United States Patent [19]

Malissin et al.

[11] 4,124,868
[45] Nov. 7, 1978

[54] HEAD CONTROL MEANS FOR OPTICAL VIDEODISC PLAYER

[75] Inventors: Roland Malissin; Gerald Roullet, both of Paris, France

[73] Assignee: Thomson-Brandt, Paris, France

[21] Appl. No.: 725,158

[22] Filed: Sep. 21, 1976

[30] Foreign Application Priority Data

Sep. 26, 1975 [FR] France .............................. 75 29606

[51] Int. Cl.$^2$ .......................................... G11B 21/04
[52] U.S. Cl. ........................ 358/128; 179/100.3 V; 179/100.4 D; 179/100.3 D
[58] Field of Search ............... 179/100.3 V, 100.4 D, 179/100.4 E, 100.1 S, 100.1 R, 100.3 D; 360/75; 358/128, 127

[56] References Cited

U.S. PATENT DOCUMENTS

| 2,100,434 | 11/1937 | Davis | 179/100.1 D |
|---|---|---|---|
| 3,582,568 | 6/1971 | Ban | 179/100.1 S |
| 3,661,397 | 5/1972 | Worth | 179/100.4 D |
| 3,864,733 | 2/1975 | Boltz | 360/33 |
| 3,931,457 | 1/1976 | Mes | 358/128 |
| 3,932,700 | 1/1976 | Snopko | 179/100.3 V |
| 3,937,903 | 2/1976 | Osann | 179/100.4 D |
| 3,984,869 | 10/1976 | Fujii | 179/100.1 VC |
| 3,989,893 | 11/1976 | Eisema | 358/127 |
| 4,005,259 | 1/1977 | Kaneko | 179/100.4 E |
| 4,017,678 | 4/1977 | Baker | 179/100.4 D |

Primary Examiner—Bernard Konick
Assistant Examiner—Alan Faber
Attorney, Agent, or Firm—Cushman, Darby & Cushman

[57] ABSTRACT

The invention relates to methods for controlling the starting and stopping of the reading of recording supports read in appropriate readers. The method according to the invention comprises providing a zone free from information at least at the beginning of the track of such a support. The reading head of the reader advances rapidly to that zone and, after having detected the presence thereof, continues its advance at a normal speed.

11 Claims, 3 Drawing Figures

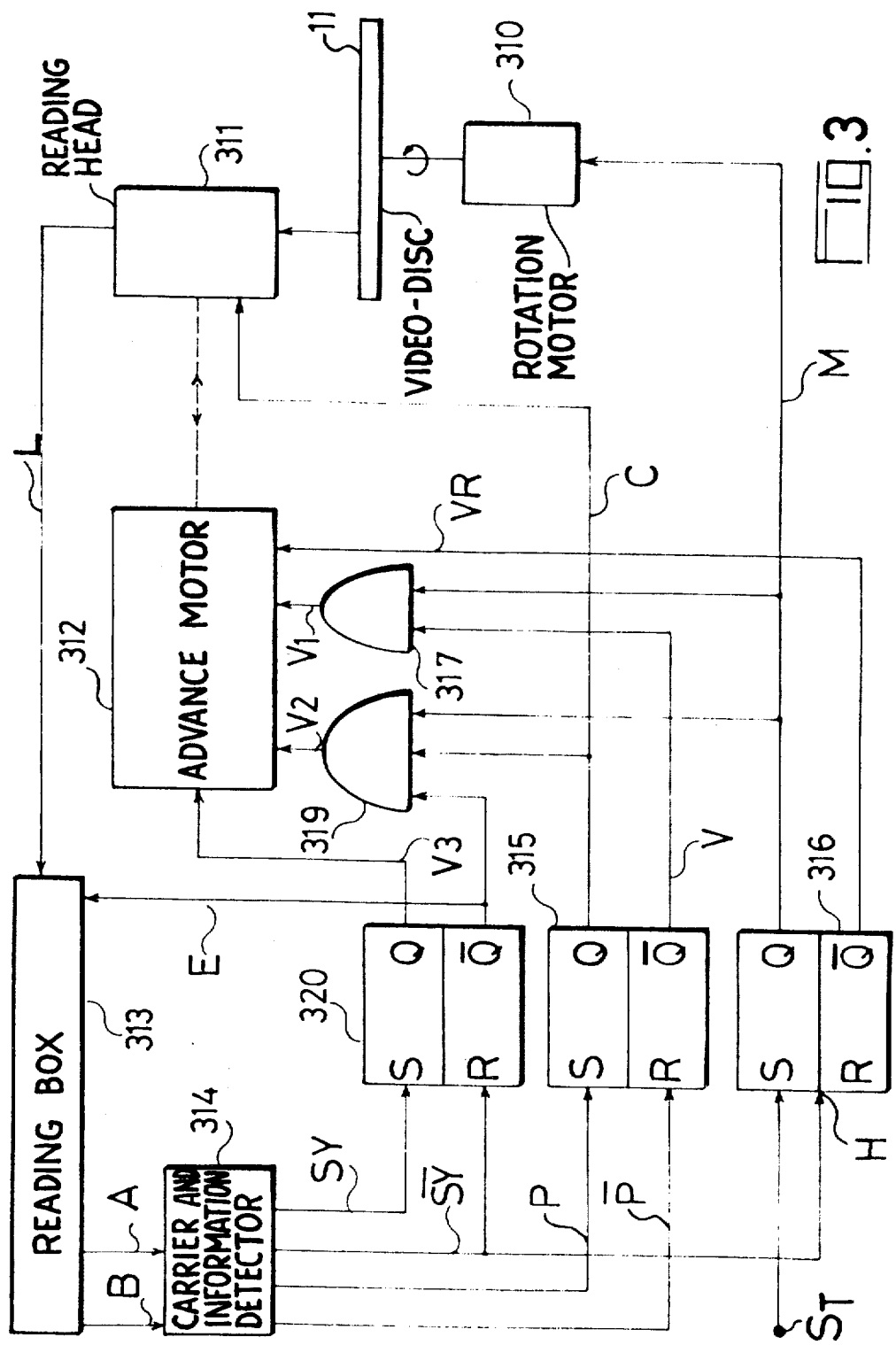

HEAD CONTROL MEANS FOR OPTICAL VIDEODISC PLAYER

This invention relates to processes for controlling the starting and stopping of the reading of a recording support. The invention also relates to the recording supports and apparatus which enable this method to be carried out.

It is known that information can be recorded onto a disc-form support on a spiral track with adjacent turns. In the discs commonly used for recording musical programs, this track is in the form of a groove produced by intaglio engraving which begins with a few blank turns having a wide pitch which enable a reading head to be brought rapidly into the zone comprising the program to be read, this reading head being provided with a needle which engages in the groove and which is used both for reading the recorded signals and for causing the head to move in a substantially radial direction relative to the disc. Towards the end of the track, the arm supporting the head moves through a position in which it releases a device which stops the reading operation. In order to ensure that this device does not operate during the recorded program, the recorded program finishes before the arm reaches the above-mentioned position so that the track terminates in a few blank turns having a wide pitch which enable the arm to move rapidly into the release position.

It is also known that it is possible to record on a support of the same disc type informations corresponding to a frequency range very much wider than that used in musical programs, for example in the form of a video signal representing a television program. The apparatus and supports in which these techniques are applied are known by the name of "videodisc" and we shall be using this term throughout the rest of this text.

One of these techniques comprises modulating a carrier wave with the signals to be reproduced and recording this carrier wave on a spiral track with adjacent turns carried by a disc in the form of lines of variable length and spacing.

In order to read a disc of this type, the disc is rotated about its axis and a reading head is moved radially in relation to the disc. In this case, the reading head operates without material contact by detecting the disturbances caused by the track in a light beam passing through the disc or reflected at its surface. The head moves at a constant speed so that it advances by one turn of the spiral forming the track per revolution. A tracking servomechanism keeps the reading light beam on the track and compensates irregularities of any kind. Another servomechanism keeps the beam constantly focussed on the surface of the disc. Depending upon the particular design, this servomechanism may or may not require the presence of the track to engage. Squelch circuits enable the output of the demodulated signals to be cut when the demodulation is not correct (absence of the carrier wave for example) so as to prevent excessively noisy signals from being obtained. These servo-mechanisms and squelch circuits are auxiliary devices.

The above-described method of controlling the starting and stopping of reading as used in discs for musical programs may be adapted to the reading of a videodisc without any guide grooves (which also comprises certain magnetic processes), but unfortunately this would impose severe stresses upon the tracking servomechanism and it would be necessary to use discs complying with strict standards in regard to the diameter of the beginning of track and end of track turns.

In accordance with the present invention it is provided a process for controlling the starting and the stopping of the reading of a recording disc intended for recording informations onto a spiral track, said track having at least at its beginning a blank zone free from recorded informations, said disc being rotated in a reader comprising a reading head which operates without mechanical guiding in contact with said disc, said process comprising the successive steps of:

moving rapidly said reading head from a rest position towards the centre of the disc;

detecting said beginning of the track;

decelerating said reading head to a normal advance speed under the control of the detecting of said beginning:

detecting the end of said track;

moving backward rapidly said reading head towards said rest position under the control of the detecting of said end.

For a beter understanding of the invention, and to show how the same may be carried into effect, reference will be made to the ensuing description and to the attached figures among which:

FIG. 3 illustrates another block diagram of a videodisc reader.

Figure 1:
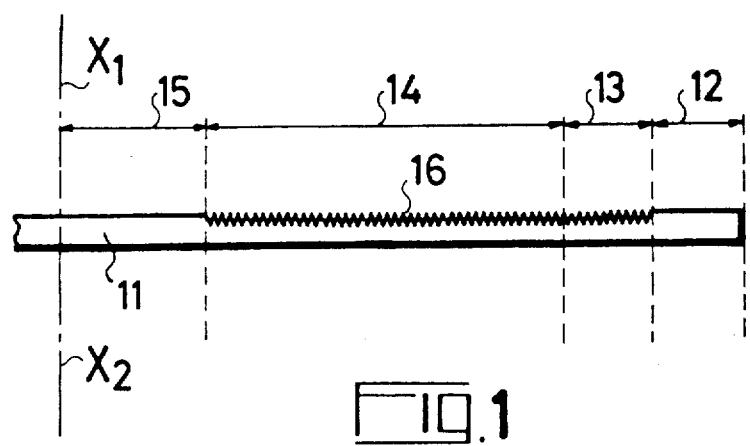
FIG. 1 illustrates a view, partly in section, of a videodisc.

FIG. 1 illustrates a section along a plane passing through its axis $X_1 X_2$ and confined to the right-hand half of a videodisc 11 according to the invention. The turns of the recording track are diagrammatically represented by the serrations 16. The surface of this disc is divided into four concentric zones 12, 13, 14, 15. The zones 12 and 15 do not comprise any recording track. The recording track is inscribed at a constant pitch on the median zones 13 and 14. That portion of the track inscribed on the zone 13 is blank which, in the case of an optically read disc means that only the pure carrier wave is recorded in the form of lines of constant length and spacing which materialise the track and distinguish the zone 13 from the zone 12.

Figure 2:
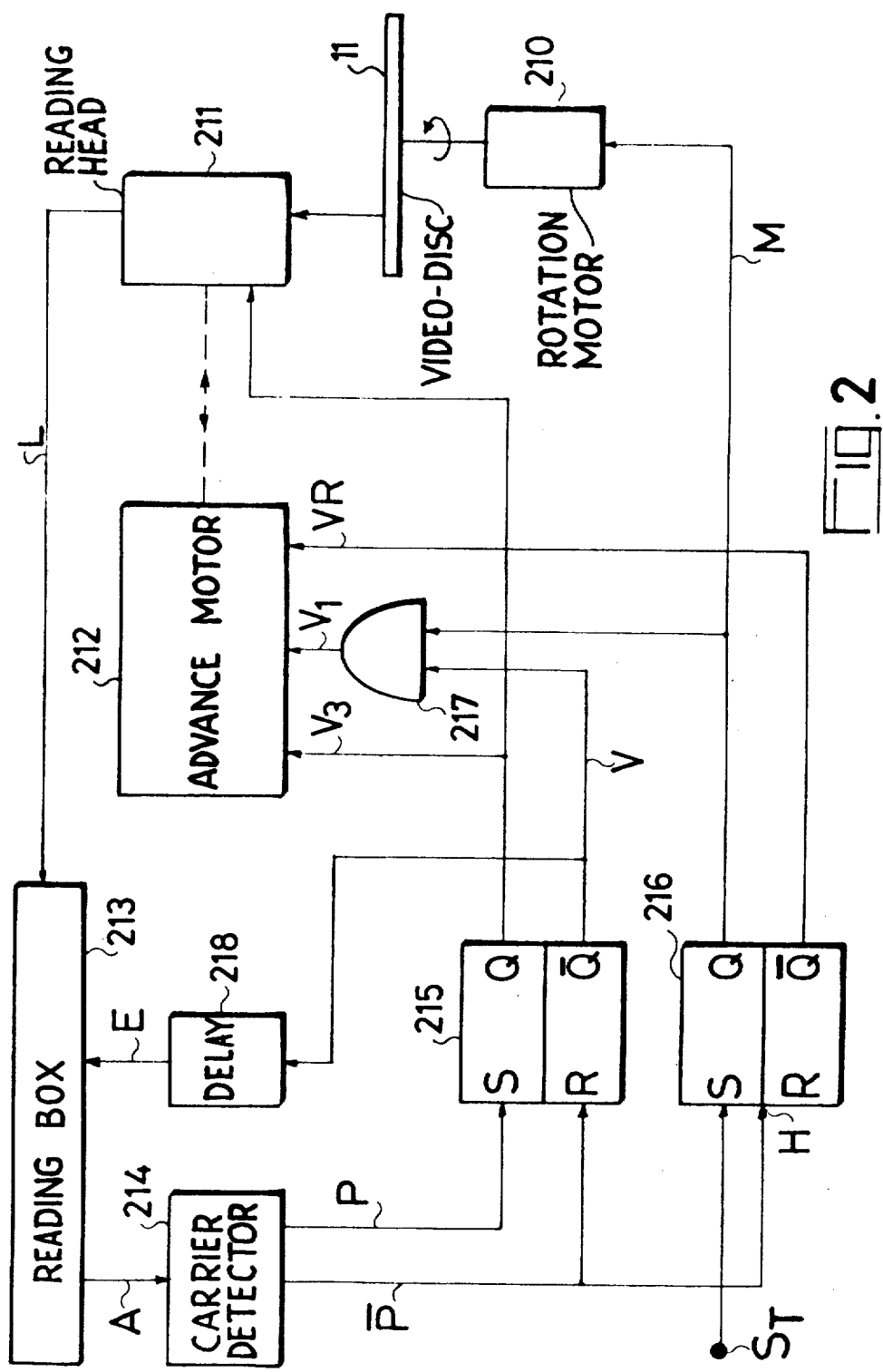
FIG. 2 illustrates a block diagram of a videodisc reader.

FIG. 2 diagrammatically illustrates one example of embodiment of a videodisc reader using the method according to the invention. This reader comprises a rotation motor 210, a reading head 211, a radial advance motor 212, a reading box 213, a detector 214, bistable trigger circuits 215 and 216, an AND-gate 217 and a delay circuit 218. We shall denote the signals in accordance with a classical positive convention, in which the active signals are denoted by the number 1 and the non-active signals by the number 0, irrespective of their shape and level. The bistable circuits 215 and 216 obey the logic $S = 1 \rightarrow Q = 1$ and $\overline{Q} = 0$ and $R = 1 \rightarrow Q = 0$ and $\overline{Q} = 1$. In addition, the bistable circuit 216 changes state when a signal applied to its input H passes from 0 to 1 and remains in its initial state when this same signal passes from 1 to 0.

The reader being assumed to be in operation, a starting signal ST applied fugitively to the input S of the bistable circuit 216 positions it in the state $Q = 1 \overline{Q} = 0$. Since in that case no signal is read on the disc, the carrier-absent signal $\overline{P}$, which will be described hereinafter, is and remains at 1. Accordingly, it does not act on the bistable circuit 216 because it is applied to its input H. By contrast, it positions the bistable circuit 215 in the state $Q = 1 \overline{Q} = 0$ because it is applied to its input R.

Under these conditions, the rotation motor 210 receives a starting signal M emanating from the output Q of the bistable circuit 216. It is thus started and rotates the disc 11 at a suitable speed.

The radial advance motor 212 receives a rapid advance signal $V_1$ from the AND-gate 217, this gate combining the signals V (output $\overline{Q}$ of the bistable circuit 215) and M which are thus both at 1. The motor 212 then rapidly moves the reading head 211 towards the centre of the disc. The reading head transmits a reading signal L which is processed in the reading box 213 in the same manner as in an ordinary videodisc reader. As long as the head 211 reads either the exterior of the disc or the zone 12 where there is no track, this signal only contains noise and the squelch circuits contained in the box 213 cut the information signals at the outputs of this box under the effect of a damping signal E which is the signal V retarded by the circuit 218. Since this delay is constant, it has no effect because the signal V is at 1 even before the beginning of the sequence.

However, a rough signal A arising out of the amplification of the signal L is permanently delivered by the box 213 to the detector 214. The detector 214 detects the presence or absence of the carrier in this signal A, for example by means of a filter followed by a threshold circuit, and accordingly delivers either the carrier-absent signals $\overline{P}$ or the carrier-present signals P.

When the reading head begins to scan the zone 13 of the disc, a signal at the frequency of the carrier appears in the signal L and hence in the signal A because, although the radial advance speed of the head is high, it is still low by comparison with the speed of the track because the disc rotates at a very high speed which currently is of the order of 1500 revolutions per minute. In this way, the head progresses by a relative oblique movement in relation to the track and intersects these tracks at a small angle which enables it to read sufficiently long sections of track to obtain a signal at the frequency of the carrier. The detector 214 thus cancels the signal $\overline{P}$ and delivers the signal P which, when applied to the input S of the bistable circuit 215, positions it in the state $Q = 1 \overline{Q} = 0$. The bistable circuit 216 remains positioned in the same state because the signal at its input H passes from 1 to 0 which does not cause it to change state.

The signal $V_1$ is thus cancelled because one of the signals (V) applied to the gate 217 passes to 0. The radial advance motor 212 thus receives a normal advance signal $V_3$ emanating from the output Q of the bistable circuit 215. Under the control of this signal $V_3$, the motor 212 slows down until it makes the head 211 advance at a normal reading speed. This same signal $V_3$ is applied to the reading head in which it controls scanning of the focussing and tracking servomechanisms. It is possible to use certain types of focussing servomechanisms which are able to lock onto the light signal supplied by the surface of the disc where there is no track. In this case, they are left to operate on their own without control of their engagement.

Since the signal V is cancelled, the signal E is also cancelled after the delay determined by the circuit 218 which controls stoppage of the squelch circuits contained in the box 213. This box may then deliver the information contained in the signal L.

To ensure that this sequence is correctly completed, it is necessary for the delay introduced by the circuit 218 to be longer than the longest of the delays attributable to the deceleration time of the motor 212 from the rapid advance speed to the normal reading speed and to the engagement time of the servomechanisms, which determines the minimum delay to be applied by the circuit 218. It is also necessary for the reading time of the zone 13 of the disc under these conditions to be longer than this delay in order not to prevent the output of the first information signals recorded on the zone 14 of the disc, which fixes the number of turns contained in this zone 13 in dependence upon the delay determined in the manner already described.

When, after having read the zone 14 of the disc, the reading head begins to read the zone 15, the carrier signals disappear from the signals L and A, which results in cancellation of the signal P and transmission of the signal $\overline{P}$. This signal $\overline{P}$ positions the bistable circuit 215 in the state $Q = 0 \overline{Q} = 1$ and causes the bistable circuit 216 to pass to the state $Q = 0 \overline{Q} = 1$ because the signal at its input H passes from 0 to 1.

The signal E becomes active again and controls the operation of the squelch circuits in the box 213. The delay introduced by the circuit 218 may be avoided by using for this circuit an arrangement which reacts differently to the descent and ascent of the signal E.

The signal M is cancelled and the motor 210 stops although the signal $V_1$ remains zero because one of the signals (M) applied to the gate 217 has passed to 0.

The motor 212 receives a return signal VR emanating from the output $\overline{Q}$ of the bistable circuit 216. This signal VR controls backward return of the head 211 and a mechanism inside the motor 212 stops the head when it is back in its rest position. It is pointed out that, since the motor 210 has been stopped, the reading head is no longer able to read the track during its return, so that the signal $\overline{P}$ remains active which prevents any relaxation phenomenon that would result in another partial reading. The reading cycle is thus terminated.

The deceleration time of the motor 212 and the engagement time of the servomechanisms of the reading head are defined with fairly considerable latitude by reason in particular of the considerable difference between the rapid approach and normal reading speeds. As a result, it is necessary to reserve a relatively large information-free zone 13 on the disc 11 to cover the most pessimistic case. It is thus of advantage, if it is possible to distinguish the modulated carrier from the pure carrier, to make the reading head pass through the zone 13 at a speed which is higher than the normal speed (twice as high for example), but distinctly lower than the rapid approach speed. Under these conditions, when the presence of the information signals is detected, the radial advance motor of the head is switched to its normal speed and the squelch circuits are neutralised at that moment without introducing any delay, the deceleration of the approach motor being quasi-immediate under these conditions. It is thus possible to extend the track beyond the end of the program recorded by a few turns comprising only the recording of the pure carrier and situated in the zone 15 of the disc. By detecting the disappearance of the modulation signals from these turns, the stop sequence is controlled.

In cases where the recorded information is in the form of a videosignal representing a television program, it is easy to detect the appearance of this signal because a signal of this type comprises synchronisation pulses which are numerous and characteristic, which enables them to be immediately identified.

FIG. 3 diagrammatically illustrates one example of embodiment of a videodisc reader using this variant of the process according to the invention. This motor comprises a rotation motor 310, a reading head 311, a radial advance motor 312, a reading box 313, a detector 314, bistable circuits 315, 316, 320 and AND-gates 317 and 319. The conventions on the signals and bistable circuits are the same as in the description of the reader shown in FIG. 2.

The reader being assumed to be in operation, a starting signal applied fugitively to the input S of the bistable circuit 316 positions it in the state $Q = 1$ $\overline{Q} = 0$. The information-absent signal $\overline{SY}$ is and remains at 1. Accordingly, it does not act on the bistable circuit 316 because it is applied to its input H. Since it is also applied to the input R of the bistable circuit 320, it positions the bistable circuit 320 in the state $\overline{Q} = 1$ $Q = 0$. The carrier-absent signal $\overline{P}$ is and remains at 1. Accordingly, it positions the bistable circuit 315 in the state $\overline{Q} = 1$ $Q = 0$ because it is applied to its input R.

Under these conditions, the rotation motor 310 receives a starting signal M emanating from the output Q of the bistable circuit 316. It is thus started and rotates the disc 11 at the required speed.

The radial advance motor 312 receives a rapid advance signal $V_1$ emanating from the AND-gate 317 which combines the advance signal V (output Q of the bistable circuit 315) and the signal M, these signals thus both being equal to 1. The motor 312 the rapidly moves the reading head 211 towards the centre of the disc. This head transmits a reading signal L which is processed in the reading box 313 in the same manner as in an ordinary videodisc reader. As long as the head 311 does not begin to read the zone 13 of the disc 11, this signal only contains noise and the squelch circuits in the box 313 function under the control of the damping signal E emanating from the output $\overline{Q}$ of the bistable circuit 320.

However, the box 313 permanently delivers a rough signal A emanating from the amplification of the signal L and an information signal B emanating from the processing of this signal L. The detector 314 detects the presence or absence of the carrier in the signal A in the same way as the detector 214 in FIG. 2 and, accordingly, delivers the carrier-absent signals $\overline{P}$ or the carrier-present signals P.

When the reading head begins to read the zone 13 of the disc 11, the detector 314 cancels the signal $\overline{P}$ and delivers the signal P which, when applied to the input S of the bistable circuit 315, positions it in the state $Q = 1$ $\overline{Q} = 0$. The signal $V_1$ is thus cancelled because one of the signals (V) applied to the gate 317 passes to 0. The AND-gate 319 then combines the signals M and the tracking signals C (output Q of the bistable circuit 315) and E. Since these three signals are in the state 1, the gate 319 delivers a semi-rapid advance signal $V_2$ to the motor 312.

The signal C simultaneously controls the scanning of the focussing and tracking servomechanisms of the head 311 or, optionally, of the tracking servomechanism only.

The motor 312 decelerates until it makes the head 311 advance at a rapid reading speed and the zone 13 of the disc is rapidly read. Large sections of track are effectively read because the tracking servomechanism corrects the excess advance imparted by the motor 312 and, when this servomechanism comes to a stop, it disengages to re-engage on a turn situated further away.

When the reading head begins to read the zone 14 of the track, the detector 314 detects the presence of modulation signals in the information signal B, for example by detecting line synchronisation signals by one of the separation techniques used in all television receivers. The detector 314 thus cancels the signal $\overline{SY}$ and delivers the signal SY which, when applied to the input S of the bistable circuit 320, positions it in the state $Q = 1$ $\overline{Q} = 0$. Since the signal SY is applied to the input H of the bistable circuit 310 and passes from 1 to 0, the bistable circuit 316 does not change state.

The signal E is then cancelled and the squelch circuits in the box 312 cease operation. Since the signal E is applied to the gate 319, the gate cancels the signal $V_2$. By contrast, the normal advance signal $V_3$ emanating from the output Q of the bistable circuit 320 is applied to the motor 312 which decelerates extremely quickly to reach its normal speed, the tracking servomechanism compensating the speed differential during the deceleration time which prevents any loss of information after the squelch circuits have opened.

As already mentioned, an additional zone comprising a few turns of the track recorded without modulation as in the zone 13 is reserved in this variant at the beginning of the zone 15 of the disc and hence at the end of the track. When the reading head begins to read these turns, the detector 314 detects the absence of modulation and thus cancels the signal $\overline{SY}$ whilst redelivering the signal SY which positions the bistable circuit 320 in the state $Q = 0$ $\overline{Q} = 1$. The signal $V_3$ is thus cancelled. On this occasion, the signal SY passes from the state 0 to the state 1 and thus causes the bistable circuit 316 to pass into the state $\overline{Q} = 1$ $Q = 0$.

The signal E is thus transmitted and actuates the squelch circuits in the box 313. By contrast, the signal M is cancelled and the motor 310 stops. Since the gates 317 and 319 receive the signal M, the signals $V_1$ and $V_2$ remain at 0. By contrast, the motor 312 receives a return signal VR emanating from the output $\overline{Q}$ of the bistable circuit 316. This signal VR controls the return of the head 311 and a mechanism inside the motor 312 stops the head once it is back in its rest position.

Since the disc no longer rotates during this return movement, the signal L is zero so that the detector 314 cancels the signal P and delivers the signal $\overline{P}$ which positions the bistable circuit 315 in the state $\overline{Q} = 1$ $Q = 0$. Thus, the servomechanisms are disconnected again and the reading cycle is thus terminated.

The operation of a reader of the type described above is thus entirely automatic except for the manual action required for controlling startup.

The following documents have been quoted in the French prosecution:
French application FR 2 181 036 (RCA)
German application DTOS 2 103 503 (Licentia).
What we claim is:

1. A process for controlling the starting and the stopping of the reading of a recording disc intended for recording information onto a spiral track, said track having at least at its beginning a blank zone free from recorded information but containing a carrier, said carrier being modulated outside said blank zone by said information, said disc being rotated in a reader comprising a reading head which operates without mechanical guiding in contact with said disc, said process comprising the successive steps of:

moving rapidly said reading head from a rest position towards the center of the disc;

detecting a signal marking said beginning of the track by detecting the presence of said carrier in said blank zone;

decelerating said reading head to a normal advance speed under the control of the detecting of said beginning;

detecting the end of said track by detecting the absence of said carrier; and moving backward rapidly said reading head towards said rest position under the control of the detecting of said end.

2. A process as claimed in claim 1, wherein said reader further comprises auxiliary apparatus including squelch circuits and focussing and tracking servomechanisms, said auxiliary apparatus being actuated during the step of decelerating under the control of the detection of said beginning, and are cut off under the control of the detecting of said end at the beginning of the step of moving backward.

3. An apparatus for reading out a recording disc intended for recording informations onto a spiral track, said track having at least at its beginning a first blank zone free from recorded information but containing a carrier, said apparatus comprising:

rotation means for rotating said disc around its axis;

a reading head operating without mechanical guiding in contact with said disc, delivering a reading signal;

advance means for radially moving said reading head forward and backward between a rest position and the centre of said disc;

means for processing said reading signal, delivering a rough amplified reading signal;

means for detecting in said rough amplified reading signal a carrier signal, delivering a set of signals indicating the presence of said carrier signal in said reading signal; and control means receiving said set of signals and an external starting signal for delivering to said rotation means a rotation signal during the reading out, and to said advance means a rapid advance signal when said carrier signal is not detected during said forward moving, a normal advance signal when said carrier signal is detected, and a forward signal when said carrier signal ends to be detected at the end of said track.

4. An apparatus as claimed in claim 3, further comprising squelch circuits, a focussing servomechanism, and a tracking servomechanism; said focussing and tracking servomechanisms being actuated by said rapid advance signal, and said control means further delivering a squelch signal for actuating said squelch circuit when said carrier signal is not detected.

5. A process for controlling the starting and stopping of the reading of a recording disc intended for recording information onto a spiral track, said track having at its beginning a first blank zone free from recorded information and at its end a second blank zone free from recorded information, said information comprising readily identifiable signals, and said disc being rotated in a reader comprising a reading head which operates without mechanical guiding in contact with said disc, said process comprising the successive steps of:

moving rapidly said reading head from a rest position towards the centre of the disc;

detecting a signal marking said beginning of the track;

first decelerating said reading head to an intermediate advance speed under the control of the detecting of said beginning;

detecting the end of said first blank zone by detecting said readily identifiable signals;

second decelerating said reading head to a normal advance speed under the control of the detecting of said end of the first blank zone;

detecting said second blank zone by detecting the vanishing of said readily identifiable signals; and moving backward rapidly said reading head towards said rest position under the control of the detecting of said second blank zone.

6. A process as claimed in claim 5, wherein, said reader further comprising squelch circuits and focussing and tracking sevomechanisms, said servomechanisms are actuated during said first decelerating under the control of the detecting of said beginning, said squelch circuits are actuated during said second decelerating under the control of the detecting of said readily identifiable signals, and said servomechanisms and said squelch circuits are cutted off under the control of the detecting of said second blank zone.

7. A process as claimed in claim 5, wherein said spiral track being constituted by the recording of a carrier, the detecting of said beginning of the track is induced by the presence of said carrier.

8. A process as claimed in claim 7, wherein said informations are a television signal comprising synchronisation signals, said readily identifiable signals being said synchronisation signals.

9. An apparatus for reading out a recording disc intended for recording informations onto a spiral track, said track having at its beginning a first blank zone free from recorded information and at its end a second blank zone free from recorded informations, said informations comprising readily identifiable signals, said apparatus comprising:

rotation means for rotating said disc around it axis;

a reading head operating without mechanical guiding in contact with said disc, delivering a reading signal;

advance means for radially moving said reading head forward and backward between a rest position and the centre of said disc;

means for processing said reading signal, delivering a rough amplified reading signal;

means for detecting in said rough amplified reading signal a carrier signal, delivering a first set of signals indicating the presence of said carrier signal in said reading signal;

means for detecting in said rough amplfied reading signal said readily identifiable signals, delivering a second set of signals indicating the presence of said readily identifiable signals in said reading signal; and control means receiving said first and second sets of signals and an external starting signal for delivering to said rotation means a rotation signal during the reading out, and to advance means a rapid advance signal when said carrier signal is not detected during said forward moving, an intermediate advance signal when said carrier signal is detected, a normal advance signal when said readily identifiable signals are detected, and a forward signal when said readily identifiable signals ends to be detected at the beginning of said second blank zone.

10. An apparatus as claimed in claim 9, further comprising squelch circuits, a focussing servomechanism and a tracking servomechanism; said focussing and tracking servomechanism being actuated by said intermediate advance signal, and said squelch circuits being actuated by said normal advance signal.

11. An apparatus as claimed in claim 9, wherein said informations are a television signal comprising synchronisation signals, said readily identifiable signals being said synchronisation signals.

* * * * *